UNITED STATES PATENT OFFICE.

ROBERT H. BRADFORD, OF SALT LAKE CITY, UTAH.

METALLURGICAL PROCESS.

1,368,885.

Specification of Letters Patent.

Patented Feb. 15, 1921.

No Drawing.

Application filed November 18, 1918. Serial No. 263,032.

*To all whom it may concern:*

Be it known that I, ROBERT H. BRADFORD, a citizen of the United States, residing at Salt Lake City, in the county of Salt Lake and State of Utah, have invented certain new and useful Improvements in Metallurgical Processes; and I do declare the following to be a full, clear, and exact description of the invention, such as will enable others skilled in the art to which it appertains to make and use the same.

My present invention relates to improvements in the extraction of copper and other metals by chloridization and volatilization, collection of fumes, conversion of the fumes into metallic state with the simultaneous regeneration of the chloridization agent for use in the first step of the process. The process is applicable to copper ores generally, not being restricted to the use of sulfid ores, or ores containing sulfur, and while applicable to such ores, is also applicable to roasted ores and to ores containing carbonate, oxid or silicate of copper, and to basic copper ores. The process is also applicable to copper ores containing other metals in addition to copper, or generally to ores containing either copper, lead, gold, or silver or ores containing several of these metals.

In order to fully describe and explain the nature of my invention, the following example of the process, as applied to silicate copper ore is given, but it is understood that the invention is not limited to the details of this specific example.

The ore is crushed or milled to a suitable state of fineness so as to enable the gases for effecting chloridization to permeate and penetrate into, and act upon, the metalliferous content of the ores. The crushed ore is then mixed with calcium chlorid or other alkaline earth halogen compound, or if desired, may be mixed with both calcium chlorid and sodium chlorid (or other alkali metal halid). The mixture is then heated in a suitable furnace, which may be a furnace of the rotary cement kiln type, or other convenient furnace such as a rabbled or reverberatory furnace, and with copper ore it is preferable to bring the heat of the material up to about 800° C, which temperature need not be exceeded for copper ore, and a somewhat lower temperature may suffice, but the temperature employed when treating silver ores is preferably somewhat higher. During the heating operation the atmosphere in contact with the ore should be non-reducing. During this operation free chlorin gas may be brought into contact with the ore, if the same is available, this aiding the chloridization operation.

During this heating operation the metals are chloridized, and are volatilized as chlorids (in the case of copper there ordinarily being produced cuprous chlorid or cupric chlorid or a mixture of vapors of cuprous chlorid and cupric chlorid), the chlorid fumes being led off to a condenser and cooled and collected in a manner well understood in the art. Any suitable type of condenser may be employed for precipitating operations, the Cottrell electric precipitator being found highly efficient.

The residue or tailings are allowed to escape from the rotary kiln or are removed from the chloridizing furnace, either continuously or intermittently, being ordinarily removed in a dry pulverulent condition showing no tendency toward fusion. The fume collected which may consist in the present example primarily of chlorids of copper is a light fluffy powder, of a gray to greenish yellow color, this fume may be compressed to a more compact state by means of packers or briqueting machines, this operation preferably being performed in connection with the next succeeding operation.

The fumes of metal chlorid recovered as above, are mixed with a suitable amount of lime or other alkaline earth material, and with a reducing agent such as powdered coke, and if desired, this operation can be effected in a pug mill or a briqueting machine, or other device, during which operation the fluffy chlorid fume will be more or less compressed. The product is then heated in a suitable furnace, such as a crucible furnace, a reverberatory furnace, or a blast furnace, to a temperature sufficiently high to cause the following reaction to take place:

$$Cu_2Cl_2 + CaO + C = 2Cu + CaCl_2 + CO,$$

or $$Cu_2Cl_2 + CaCO_3 + C = 2Cu + CaCl_2 + CO + CO_2$$

During the heating operation any cupric chlorid present is changed to cuprous chlorid:

$$2CuCl_2 + heat = Cu_2Cl_2 + Cl_2$$

The temperature in the case of copper is preferably carried during this operation up to a little above the melting point of copper, say, 1100° C., so that in a single operation the copper is formed and melted, the calcium chlorid is formed and melted, and the copper settles to the bottom of the melt, and thereby separated from the calcium chlorid slag and the two can be separately drawn off. After this the copper or other metal is refined in any suitable manner if desired.

The calcium chlorid slag produced in the last operation is then reduced to a suitable state of fineness or is dissolved in water and is employed by mixing with a further quantity of the ore for use in the process of volatilization. It will be understood that the details of the process can be varied more or less, depending upon the nature of the particular ore under treatment, metal content of this ore, and local conditions, and the example is given for the purpose of illustration rather than as limiting the invention to the specific details thereof.

The use of $CaCl_2$ as the chloridizing agent especially recommends itself in that this material is itself not readily volatile under the conditions present, and it accordingly is not necessary to employ substantially more than an amount thereof chemically equivalent to the copper or other volatilizable metal of the ore. Calcium chlorid readily decomposes when heated with contact reagents such as silica. In these respects it is a decided advantage over sodium chlorid, heretofore most generally used in chloridizing roasting. The use of $CaCl_2$ is further advantageous in that substantially the entire amount thereof is regenerated during the process, and any deficiency thereof can be made up by the addition of a small amount of calcium chlorid or of common salt in the chloridizing operation.

Calcium chlorid with or without a little sodium chlorid, or chlorin, used in the chloridizing operation is found to be highly active and hence the chloridization of the metal content of the ore is very complete by this process.

The addition of a copper mineral or of a copper ore to a silver ore in this chloridization-volatilization process assists in the ready volatilization of the silver in the ore. A small amount of copper mineral or a copper ore may be mixed with a silver ore with decidedly beneficial results, the copper of the admixed mineral or ore being volatilized and collected and with it the silver present in the mixed materials. The silver is much more readily volatilized when the copper is present.

What I claim is:

1. A process of producing copper from its ores which comprises mixing the said ore having a sulfur content widely different from the amount which would be chemically equivalent to the amount of copper and other chloridizable metal in the ore, with an alkaline earth halid, such material being added in amount approximately chemically equivalent to the amount of copper and other volatilizable metal in the said ore, heating said mixture to a temperature of approximately 800° C., while in a non-reducing atmosphere, collecting in a dry state the copper halid volatilized during such heating operation, and mixing the same with an alkaline earth and a reducing agent and heating the same sufficiently to reduce the fume to metal and to fuse the metal formed, whereby alkaline earth halid is reformed for reuse in the first part of the process.

2. A process of producing copper from its ores which comprises mixing an oxidized copper ore containing no material amount of sulfur, with alkaline earth metal chlorid in amount approximately chemically equivalent to the metalliferous content of the said ore, heating the mixture in a non-reducing atmosphere to a temperature high enough to volatilize the bulk of the copper and other chloridizable metals, in the form of chlorid, but not materially over 800° C., collecting the fume in a dry state, mixing the same with an alkaline earth material and a carbonaceous reducing agent and heating to slightly above the melting point of copper, whereby metallic copper is produced and alkaline earth metal chlorid regenerated for reuse in the first step of the process.

3. A cyclic process of chloridizing the copper content of ores, which comprises mixing the copper ore with alkaline earth metal chlorid, in such proportions that the amount of copper present in the ore is capable of chemically combining with the amount of chlorin in the said chlorid to produce cupric chlorid, heating the mixture in a non-reducing atmosphere to a temperature of approximately 800° C., whereby substantially the entire quantity of copper present in the ore is converted into cupric chlorid which is volatilized, collecting the cupric chlorid fume in a dry state, mixing the same with an alkaline earth material and a carbonaceous reducing agent and heating to somewhat above the melting point of copper, whereby metallic copper is produced and alkaline earth metal chlorid regenerated for reuse in the first part of the process, and whereby the copper is caused to separate in a molten condition from the chlorid slag.

In testimony whereof I have hereunto set my hand.

ROBERT H. BRADFORD.